United States Patent
Khu et al.

(10) Patent No.: US 11,876,357 B2
(45) Date of Patent: Jan. 16, 2024

(54) DEVICE AND USE OF THE DEVICE FOR STRIPPING A CABLE

(71) Applicant: Komax Holding AG, Dierikon (CH)

(72) Inventors: Peter Khu, Vienna (AT); Andreas Zelzer, Schönberg (DE)

(73) Assignee: KOMAX HOLDING, AG, Dierikon (CH)

( * ) Notice: Subject to any disclaimer, the term of this patent is extended or adjusted under 35 U.S.C. 154(b) by 0 days.

(21) Appl. No.: 18/055,815

(22) Filed: Nov. 15, 2022

(65) Prior Publication Data

US 2023/0155360 A1 May 18, 2023

(30) Foreign Application Priority Data

Nov. 15, 2021 (EP) .................................... 21208292

(51) Int. Cl.
 *H02G 1/12* (2006.01)
(52) U.S. Cl.
 CPC ................................. *H02G 1/1265* (2013.01)
(58) Field of Classification Search
 CPC ............. Y10T 83/0467; H02G 1/1265; H02G 1/1278; H02G 1/127; H02G 1/1248; H02G 1/12; H02G 1/1202; H02G 1/1251; H02G 1/1253; H02G 1/1256
 USPC .................. 81/9.4, 9.51, 9.41, 9.42
 See application file for complete search history.

(56) References Cited

U.S. PATENT DOCUMENTS

| 2,647,309 | A | * | 8/1953 | Chisena | H02G 1/1217 30/90.9 |
| 3,818,591 | A | * | 6/1974 | Peter | H02G 1/1217 30/90.9 |
| 2020/0412114 | A1 | * | 12/2020 | Sugawara | H02G 1/005 |
| 2021/0273426 | A1 | * | 9/2021 | Khu | H02G 1/1265 |

FOREIGN PATENT DOCUMENTS

| DE | 2158888 A1 | 4/1973 |
| EP | 2693581 A1 | 2/2014 |
| FR | 2373131 A1 | 6/1978 |
| JP | H09308038 A | 11/1997 |
| WO | 2019243193 A1 | 12/2019 |

OTHER PUBLICATIONS

Extended European Search Report; Application No. 21208292.9; Completed: Apr. 26, 2022; dated May 4, 2022; 10 Pages.

* cited by examiner

*Primary Examiner* — Phong H Nguyen
(74) *Attorney, Agent, or Firm* — Husch Blackwell LLP

(57) ABSTRACT

A device for stripping cable has a support roller arrangement and a work wheel arrangement. The support roller arrangement is on a rotation base rotatable about an axis of rotation and the work wheel arrangement is on a work wheel guide. The rotation base and the work wheel guide are connected via at least one guide and the work wheel guide is displaceable relative to the rotation base in a guide direction running transversely to the axis of rotation. The support roller arrangement has at least two support rollers each mounted on the rotation base so as to be rotatable about a support roller axis and the work wheel arrangement has a rolling wheel mounted on the work wheel guide so as to be rotatable about a rolling wheel axis. A clamping region is formed around the axis of rotation and between the support rollers and the rolling wheel.

15 Claims, 6 Drawing Sheets

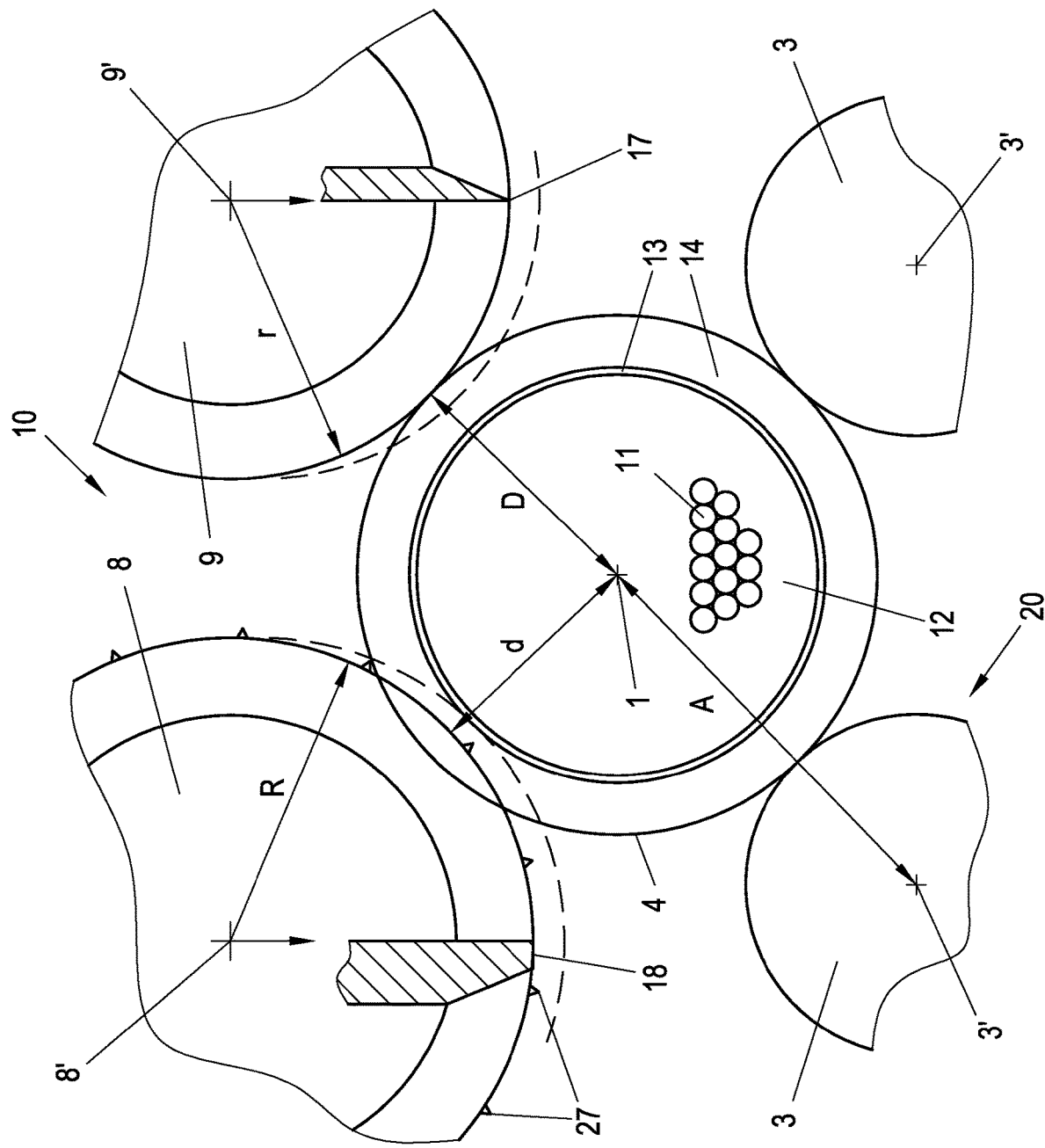

DEVICE AND USE OF THE DEVICE FOR STRIPPING A CABLE

TECHNICAL FIELD

The present teaching relates to a device for stripping a cable having an outer protective sheath, the device having a support roller arrangement and a work wheel arrangement, the support roller arrangement being arranged on a rotation base of the device that is rotatable about an axis of rotation and the work wheel arrangement being arranged on a work wheel guide, the rotation base and the work wheel guide being connected to one another via at least one guide and the work wheel guide being displaceable relative to the rotation base in a guide direction running transversely to the axis of rotation, the support roller arrangement comprising at least two support rollers each mounted on the rotation base so as to be rotatable about a support roller axis and the work wheel arrangement comprising a rolling wheel mounted on the work wheel guide so as to be rotatable about a rolling wheel axis and a clamping region being formed around the axis of rotation and between the at least two support rollers and the rolling wheel, which clamping region can, by displacing the work wheel guide in the guide direction relative to the rotation base, be enlarged and reduced depending on the displacement direction. The present teaching also relates to a use of this device for stripping a cable having an outer protective sheath that is to be removed by the stripping.

BACKGROUND

Shielded cables substantially consist of a shielded wire arrangement that has one or more conductors, at least one shielding layer surrounding the wire arrangement, and an outer protective sheath. The shielding layer and the protective sheath are arranged concentrically around the wire arrangement, the shielding layer shielding the wire arrangement against electrical or magnetic fields and the protective sheath arranged around the shielding layer offering in particular mechanical protection against external influences and electrical insulation of the wire arrangement.

The shielding layer of the shielded cable is often made of a shielding braid and a shield foil surrounding the shielding braid. The protective sheath in turn surrounds the shield foil. An additional problem with stripping is the static friction between the protective sheath and the shield foil. Sometimes, the protective sheath and shield foil are even glued or welded to one another. For stripping such cables, the protective sheath and the shield foil must be processed in one operation, since the protective sheath alone cannot be removed. In such situations, the stripping is particularly difficult because a part of the shielding layer must be removed, but the shielding braid of the shielding layer must not be damaged.

To connect shielded cables, it is necessary to sever the protective sheath around the cable at a specific distance from the cable end and then pull it off the shielding layer, optionally also with a shield foil. This process is also referred to as stripping. However, the shielding layer or at least the required part of the shielding layer must remain intact, since otherwise a functioning shield is not ensured or connection of the shield, usually to an electrical reference potential, is not possible at all after the cable is connected.

The shielding layer generally consists of an extremely thin and sensitive material, for example a thin aluminum foil, a plastics material film coated with metal (shield foil), a filigree wire mesh, or a plurality of such layers. The protective sheath, on the other hand, must be made of a resistant material, for example of resistant plastics materials, such as PUR, PVC, silicone, etc., and must have corresponding thicknesses. The protective sheath is significantly thicker than the shielding layer.

The stripping of shielded cables is therefore mostly done by hand and requires dexterity and experience. Known mechanical aids, such as wire strippers or rotary cutters, also require very careful and experienced handling, since they can also easily destroy the shielding.

The installation of numerous shielded cable connections, as required in the industrial production of electric cars for example, can therefore be a time-consuming undertaking.

EP 2 693 581 A1 discloses a device for stripping shielded cables having a blade arrangement that can be rotated around the cable and the infeed of which can be changed for making a cut in the protective sheath. An electronic detection device determines when the blades come into contact with the shield, but it is usually too late when the detection device strikes because the shield or the conductor has already been cut or damaged.

WO 2019/243193 A1 shows a device for stripping a shielded cable with a support roller arrangement having a plurality of support wheels, and a work wheel arrangement having a rolling wheel. When the device is used, the cable is clamped between the support roller arrangement and the work wheel arrangement, and both arrangements rotate around the stationary cable. The work wheel arrangement is displaceable transversely to the axis of rotation so that the rolling wheel, due to rotation, can penetrate the outer protective sheath of the cable and can cut said outer protective sheath along the circumference. In addition, the work wheel arrangement can also comprise a cutting wheel or a cutting blade that support the severing of the protective sheath. A disadvantage of this device is that the rolling wheel can cause deformation or even damage to the sensitive shielding layer, or a part thereof, in the case of softer cables. This has been found in particular in the case of cables whose shielding layer is surrounded by a shield foil that likewise has to be severed during stripping. For severing such a shield foil, corresponding pressure forces must be applied to the shield foil by the rolling wheel, which can deform or damage the underlying parts of the shielding layer, for example a shielding braid.

SUMMARY

It is one object of the present teaching to provide devices and methods by means of which stripping of cables, in particular shielded cables, can be carried out easily and reliably without adversely affecting a shielding layer by the stripping, in particular by deforming or damaging it.

According to the present teaching, this object is achieved by a device of the type mentioned at the outset, in which a plurality of perforation elements are arranged on the rolling wheel on a radially outer rolling contour such that they are distributed over the circumference, which perforation elements protrude radially by a length from the rolling contour. By means of the rolling wheel, on the one hand, the protective sheath, which is usually made of a plastics material, is effectively severed in that the rolling wheel rolling over on the cable sheath along a cutting region wears down the material of the cable sheath until finally the cable sheath no longer withstands the pressure of the rolling wheel and said rolling wheel can radially penetrate and sever the cable sheath. By contrast, the rolling wheel cannot penetrate a harder and more solid shielding layer in the cable and said layer therefore remains undamaged. On the other hand, the radially projecting perforation elements ensure that the local pressure of the rolling wheel on the shielding layer, in particular on a shielding braid of a shielding layer, remains low, thereby preventing any disadvantageous deformation or even damage to the shielding layer. Moreover, the perforation elements also ensure that any shield foil that is present is perforated and can then easily be removed from the cable along the perforation. In this case, the perforation elements penetrate only slightly into an underlying shielding braid, so that said shielding braid is not damaged. The pressure force of the rolling wheel required for this can be easily generated and controlled by corresponding adjusting means, for example by springs or corresponding actuating drives.

In an advantageous manner, the length and/or position of the guide are adjustable, for example, by means of limiting elements and/or adjusting screws. This allows the device to be easily adapted to different cable thicknesses.

In order to support the severing of the protective sheath of the cable, the work wheel arrangement additionally comprises a cutting wheel that is mounted on the work wheel guide so as to be rotatable about a cutting wheel axis, which cutting wheel has a radially outer cutting edge or a cutting blade arranged on the work wheel guide. In this case, the clamping region is formed between the at least two support rollers, the rolling wheel and the cutting wheel. The cutting wheel actively cuts into the protective sheath and thus facilitates the radial penetration of the rolling wheel into the protective sheath.

It is advantageous in this case if the radially outer rolling contour of the rolling wheel is arranged closer to the axis of rotation than the radially outer edge of the cutting edge of the cutting wheel. It can thus be achieved that the cutting edge of the cutting wheel does not come into contact with the shielding layer, in particular with a shielding braid of the shielding layer, during the stripping process and cannot damage said shielding layer.

In order for the perforation elements to reliably perforate a shield foil, but not to penetrate too far into a shielding braid of a shielding layer, it is preferably provided that the length of the perforation elements is between 0.02 mm and 0.5 mm.

In order to be able to use the rolling wheel for different cables and to achieve the most uniform possible perforation patterns along the circumference, it is advantageously provided that two perforation elements adjacent in the circumferential direction are arranged spaced apart from one another in the circumferential direction by a perforation increment, the perforation increment being in a range $$\left[\frac{U}{n}, \frac{U}{n+1}\right],$$

n being a natural number between 2 and 15, preferably between 2 and 10, and U indicating a circumferential length on a radius about the axis of rotation on which the perforation elements are to produce perforations when the device is used. The perforation increment is preferably selected as centrally as possible in this range.

If the work wheel guide has an eccentric weight distribution with respect to the axis of rotation, as a result of which a centrifugal force acts on the work wheel guide when the rotation base with the work wheel guide arranged on the rotation base via the guides rotates about the axis of rotation, the required pressing force for severing the protective sheath can be brought about in a simple manner by the acting centrifugal force. This can be influenced and controlled easily and reliably by the weight distribution and/or the rotational speed. In this case, no adjusting means, such as tension springs or actuating drives, are required to generate the pressure force.

The device is used for stripping a cable having an outer protective sheath, the end of the cable to be stripped being clamped in the clamping region between the rolling wheel of the work wheel arrangement and the at least two support rollers of the support roller arrangement by applying a pressure force, the unit formed of the work wheel arrangement and the support roller arrangement rotating around the cable by rotation of the rotation base, and the rolling wheel and the at least two support rollers rolling over on the cable, and the work wheel guide having the work wheel arrangement being displaced in the guide direction toward the axis of rotation, so that the rolling wheel radially penetrates the protective sheath of the cable in a cutting region produced by the roller contour and severs the protective sheath of the cable along the circumference. The displacement of the work wheel guide having the work wheel arrangement advantageously takes place by means of the pressure force that is preferably brought about by an acting centrifugal force.

During stripping, it is preferably provided that the rolling wheel radially penetrates the protective sheath of the cable until the rolling contour reaches a shielding layer in the cable. If the shielding layer comprises a shielding braid and a shield foil surrounding the shielding braid, the rolling wheel preferably radially penetrates the cable during stripping until the rolling contour reaches the shield foil in the cable, whereby the shield foil is perforated over the circumference thereof by the perforation elements of the rolling wheel. In this way, stripping and at the same time perforating of the shield foil can be achieved, which shield foil can then be easily pulled off along the perforation with the protective sheath removed.

In order to be able to monitor the stripping process easily, it can be provided that the shielding braid of the cable to be stripped is electrically contacted by means of an electrical test contact, the test contact being electrically connected to the rolling wheel, and a measuring device and an electrical continuity check being used to check whether the rolling wheel comes into contact with the shielding braid during stripping and the stripping process is ended in the event that contact is identified. For the electrical continuity check, for example, a required electrical voltage can be applied between the test contact and the rolling wheel.

For quality assurance of the stripping process, it can also be provided that the shielding braid of the cable to be stripped is electrically contacted by means of an electrical test contact, and the test contact is electrically connected to the cutting wheel or the cutting blade, and a measuring device and an electrical continuity check are used to check whether the cutting wheel or the cutting blade comes into contact with the shielding braid during stripping. In this way, cables in which the cutting wheel or the cutting blade were in contact with the shielding braid during stripping can be eliminated.

BRIEF DESCRIPTION OF THE DRAWINGS

In the following, the present teaching is described in greater detail with reference to FIGS. 1 to 13, which, by way of example, show schematic and non-limiting advantageous embodiments of the present teaching. In the drawings:

FIG. 3 is a schematic cross section of a cable which is arranged for stripping in the device according to the present teaching and the work wheel arrangement and the support roller arrangement engaging the cable.

DETAILED DESCRIPTION

Figure 2:
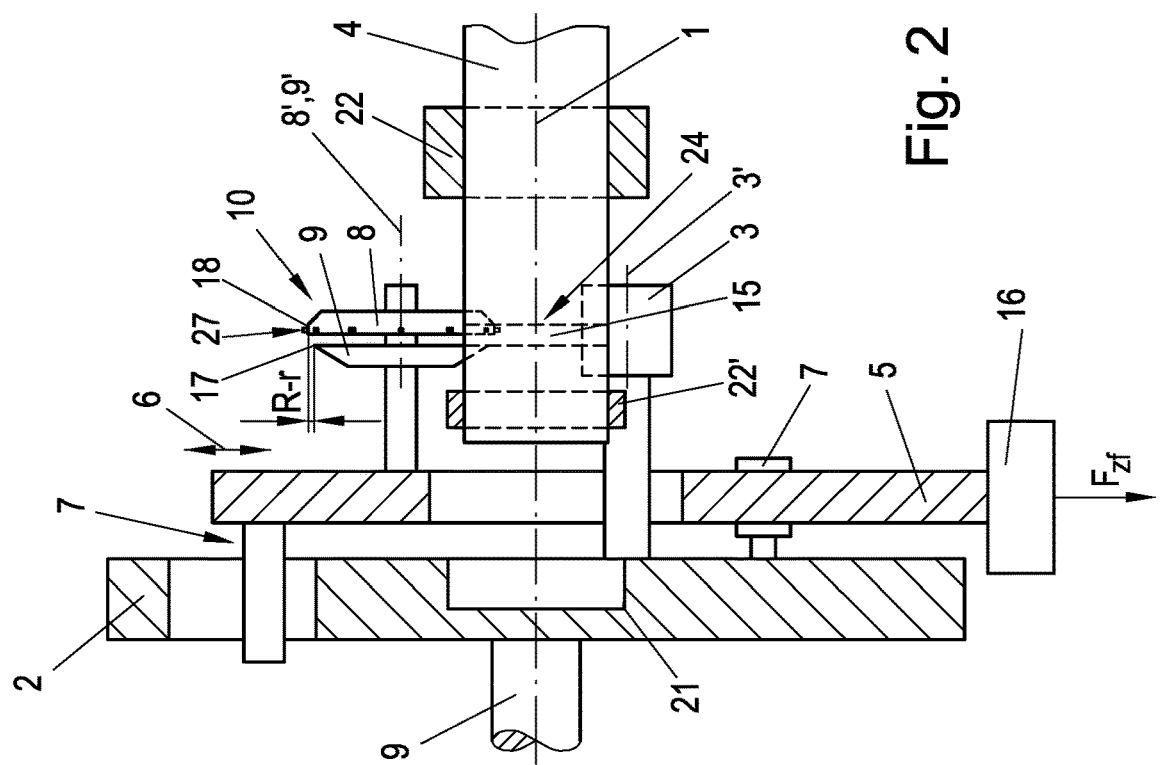
FIG. 2 is a sectional view of the device shown in FIG. 1 along the line II-II in FIG. 1.
Figure 1:
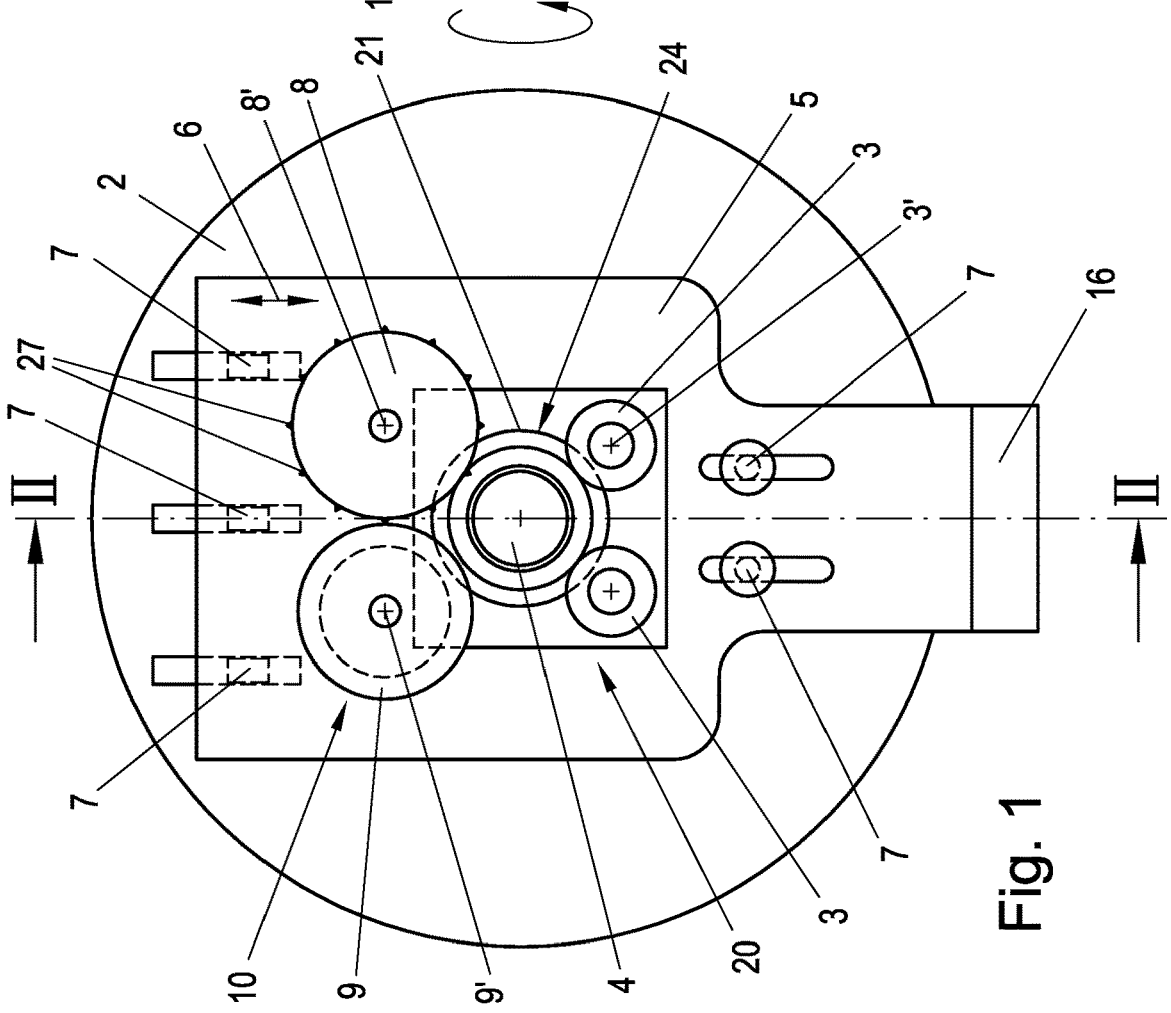
FIG. 1 is a schematic front view of an exemplary embodiment of the device for stripping cables according to the present teaching.

The device for stripping a cable 4 shown by way of example in FIGS. 1 and 2 has a preferably plate-shaped rotation base 2 which is rotatable about an axis of rotation 1 and on the front of which there is arranged a support roller arrangement 20 consisting of a plurality of support rollers 3, for example a pair of support rollers 3 as in the embodiment shown. Each support roller 3 is mounted rotatably about a support roller axis 3' on the rotation base 2. In the use of the device, the rotation base 2 rotates about the axis of rotation 1. For this purpose, the rotation base 2 is driven to rotate in a predetermined direction of rotation about the axis of rotation 1.

The rotation base 2 can be connected, for example, via a shaft 19 to a drive (not shown), for example a motor or a combination of a motor and a transmission, that drives the rotation base 2.

The support roller axes 3' of the support rollers 3 are preferably arranged parallel to the axis of rotation 1 of the rotation base 2 and have a radial distance A (e.g. FIG. 3) to the axis of rotation 1, which radial distance is selected in relation to the diameter of a cable 4 to be stripped in such a way that the cable 4 arranged on the support rollers 3 is oriented centrally relative to the axis of rotation 1, i.e., the longitudinal axis of the cable 4 coincides with the axis of rotation 1. The diameters of the support rollers 3 and their radial distances A do not necessarily have to be the same. Optionally, the radial distance A of the support rollers 3 on the rotation base 2 can be adjusted in order to be able to adjust the device to cables 4 of different diameters. However, the rotation base 2 can also be changed to adapt to different cables 4. During the stripping of the cable 4, however, the position of the support rollers 3 remains unchanged in relation to the rotating rotation base 2, the support rollers 3 moving with the rotating rotation base 2 around the cable 4 and rolling on the outer sheath thereof.

A preferably plate-shaped work wheel guide 5 is arranged on the rotation base 2 and is displaceable relative to the rotation base 2 in a guide direction 6 running transversely, preferably perpendicularly, to the axis of rotation 1. The work wheel guide 5 can for example be connected to the rotation base 2 via one or more guides 7. A guide 7 can be designed as a linear guide, as shown in FIGS. 1 and 2. A linear guide can be designed as a slot guide in which sliding bodies are displaceably arranged in guide slots. However, guides 7 of any other design can also be used. Optionally, the length of the guides 7 can also be adjusted and/or limited, for example via adjustable limiting elements (such as adjusting screws), in order to restrict the possible range of movement of the work wheel guide 5 relative to the rotation base 2. Usable guides 7 and corresponding limiting elements are sufficiently known to a person skilled in the art and therefore do not have to be described in more detail. When designing the guides 7, sufficient precision of movement must be ensured.

The rotation base 2 can optionally be provided with a central recess 21 into which the end of the cable 4 can protrude or through which the cable 4 can protrude so that the space required by the rotating parts can be minimized. The recess 21 is only indicated schematically in FIG. 1, but it can also be made significantly deeper and can also be continuous through the rotation base 2. In the latter case, the drive of the rotation base 2 is to be designed in a suitable manner.

A work wheel arrangement 10 is arranged on the work wheel guide 5, the work wheel arrangement 10 comprising at least one rolling wheel 8. In an advantageous embodiment, the work wheel arrangement 10 additionally also comprises a cutting wheel 9. In a preferred embodiment, the work wheel arrangement 10 comprises a rolling wheel 8 and a cutting wheel 9. Such an embodiment is shown in FIGS. 1 and 2.

As a result of said embodiment of the device, a clamping region 24 is formed around the axis of rotation 1 and between the at least two support rollers 3 and the rolling wheel 8, and optionally the cutting wheel 9, which clamping region can, by displacing the work wheel guide 5 in the guide direction 6 relative to the rotation base 2, be enlarged and reduced depending on the displacement direction. The cable 4 to be stripped is arranged in said clamping region 24 and clamped between the at least two support rollers 3 and the rolling wheel 8, and optionally the cutting wheel 9, when the device is used. As a result of the rotation of the rotation base 2, the support roller arrangement 20 with the support rollers 3 and the work wheel guide 5 with the rolling wheel 8, and optionally the cutting wheel 9, rotate around the clamping region 24. If a cable 4 is arranged and clamped in the clamping region 24, the support rollers 3 and the rolling wheel 8, and optionally the cutting wheel 9, roll over on the outer sheath of the cable 4. The cable 4 does not also rotate here.

The rolling wheel 8 and cutting wheel 9 (if present) are arranged so as to be rotatably mounted on the work wheel guide 5 and for this purpose have a rolling wheel axis 8' and cutting wheel axis 9', preferably arranged parallel to the axis of rotation 1. With respect to the axis of rotation 1 (and the resulting position of the cable 4 in the device), the work wheel arrangement 10 is arranged in the guide direction 6 on the side opposite the support rollers 3, so that the cable 4 resting on the support rollers 3 can be clamped between the support rollers 3 and the work wheel arrangement 10 by displacing the work wheel arrangement 10 in the guide direction 6. In the embodiment according to FIG. 1, the cable 4 is clamped between the support rollers 3 and the rolling wheel 8 and the cutting wheel 9 of the work wheel arrangement 10. When the rotation base 2 now rotates about the axis of rotation 1, the support rollers 3, the rolling wheel 8, and the cutting wheel 9 (if present) roll over on the sheath of the cable 4, i.e. on its protective sheath 14, along a cutting region 15 in the circumferential direction.

It should be noted that the cutting region 15 does not have to be a cutting line, but rather generally identifies a region extending in the axial direction of the cable 4 in which the protective sheath 14 of the cable is to be severed. As will be explained in the following, the action of the rolling wheel 8 on the cable 4 also extends in the axial direction laterally beyond the region of direct contact between the rolling wheel 8 and protective sheath 14, so that the rolling wheel 8 and the cutting wheel 9 can also be arranged in the axial direction slightly offset to one another laterally (as shown in FIG. 2). The axial region that is affected by the action of the rolling wheel 8 is referred to as the cutting region 15 in connection with the present teaching.

The cable 4 can also be secured in a fixed (i.e. not rotating with the rotating parts of the device) clamping device 22, which is only indicated schematically in FIG. 2. The clamping device 22 can be arranged very close to the work wheel guide 5, in order to press the cable 4 into its round cross-sectional shape and to hold it therein during processing. This is particularly advantageous with softer cables 4. If necessary, the free end of the cable 4 can also be held with a corresponding inner clamping device 22' (this is also indicated schematically in FIG. 2), wherein the inner clamping device 22' can be mounted on the rotation base 2, for example by means of a ball bearing (not shown). Thus, the inner clamping device can be stationary during the rotation of the moving parts and can center the cable 4. The inner clamping device 22' can then also be used, for example, to pull the separated part of the protective sheath 44 off the cable 4 after processing.

At the end of the work wheel guide 5 that is in relation to the axis of rotation 1 and in the guide direction 6 opposite the work wheel arrangement 10, a weight 16 is provided in the embodiment according to FIGS. 1 and 2 that gives the work wheel guide 5 an eccentric weight distribution with respect to the axis of rotation 1. The eccentric weight distribution can also be ensured without additional weight 16 solely by the shape of the work wheel guide 5.

When the rotation base 2 rotates about the axis of rotation 1 with the work wheel guide 5 arranged thereon via the linear guides 7, a centrifugal force $F_{zf}$ acts on the work wheel guide 5 in the guide direction 6 on account of the eccentric weight distribution, so that the work wheel guide 5 having the work wheel arrangement 10 is pressed against the outer surface of the cable 4 (or against the counterforce applied by the support rollers 3). The pressure force of the working arrangement 10 against the cable 4 can thus be controlled structurally via the design of the weight distribution of the work wheel guide 5, for example by means of the weight 16, and procedurally via the rotational speed. If necessary, the weight 16 can be designed to be exchangeable or changeable in order to vary the pressure force. The work wheel guide 5 can optionally be pretensioned by means of tensioning means, such as springs, into the "open" position, in which the support rollers 3 and the work wheel arrangement 10 are farthest apart from each other, the work wheel arrangement 10 then only coming into contact with the protective sheath 14 of the cable 4 when the rotation base 2 of the device rotates sufficiently quickly and the work wheel guide 5, due to the centrifugal force $F_{zf}$, acts sufficiently strongly against the force applied by the tensioning means. Alternatively or additionally, the drive of the rotating parts can be controlled in such a way that the weight 16 is arranged at the top at a standstill, so that the work wheel arrangement 10 is automatically pressed downwards (i.e., into the open position) by its own weight.

However, the pressure force can also be applied by corresponding actuators, such as a spring or an actuating drive. In this case also, no eccentric weight distribution of the work wheel guide 5 is required. A combination of an actuating drive and the effect of a centrifugal force $F_{zf}$ is also conceivable.

In connection with the present disclosure, the "front side" is the side of the device on which the cable 4 to be stripped is to be arranged, i.e. the side shown in FIG. 1 or the right side in FIG. 2. The term is only used for understanding and orientation and is not to be interpreted restrictively. In particular, it would also be possible to "reverse" the arrangement of rotation base 2 and work wheel guide 5, so that the work wheel guide 5 with the elements arranged thereon is arranged opposite the front side, i.e., "behind" the rotation base 2, the cable 4 then being inserted through a central opening provided in the rotation base 2 in order to come into contact with the work wheel arrangement 10 and support roller arrangement 20. If necessary, the work wheel arrangement 10 can also be arranged in the axial direction between the rotation base 2 and the work wheel guide 5, or it can be arranged in a protected manner in an interior of the work wheel guide 5. Implementation of the design changes required for such alternative embodiments is within the ability of an ordinary person skilled in the art.

Figure 4:
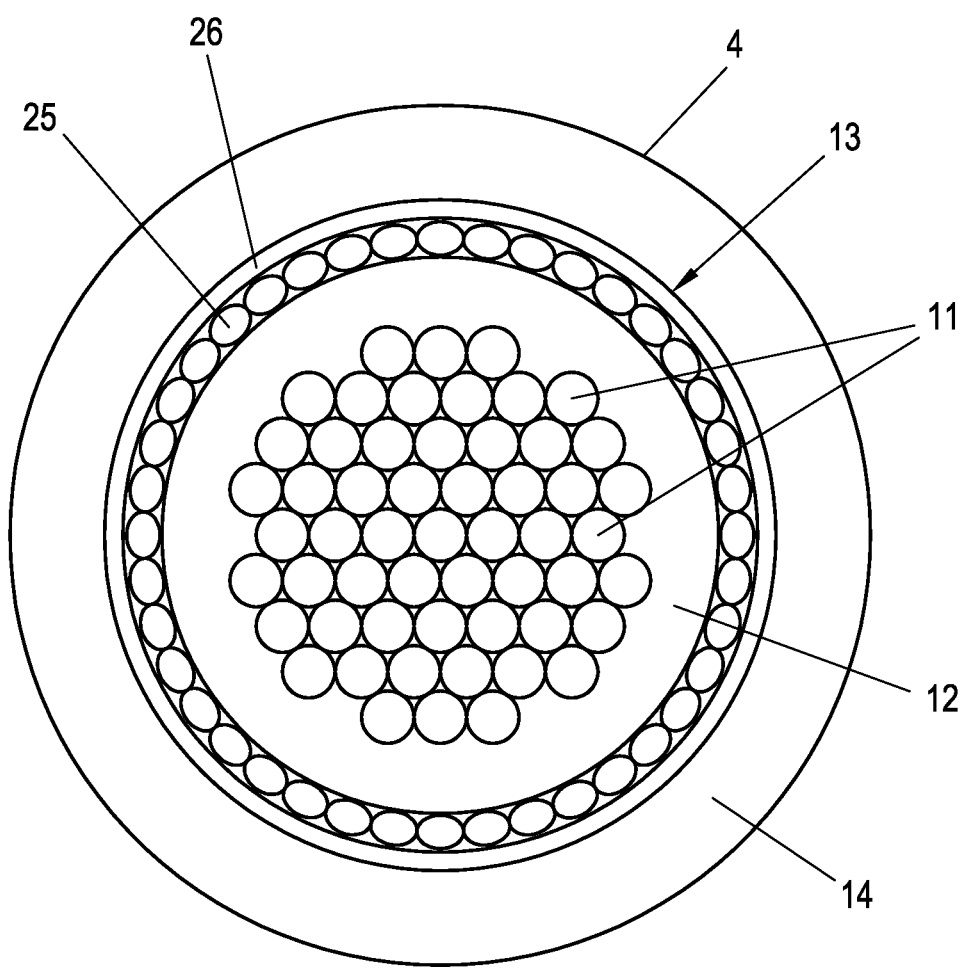
FIG. 4 is a typical cross section of a cable to be stripped with a shielding braid and a shield foil.

As shown in FIG. 4, the cable 4 consists substantially of a conductor 11 or a plurality of conductors 11 which are arranged in a wire arrangement 12 forming the core of the cable 4. The individual conductors 11 can be electrically insulated from one another or towards the outside, it being possible for further layers to be provided depending on the cable type, for example in order to separate individual conductor bundles from one another in the wire arrangement 12. A shielding layer 13, for example a thin metal foil, for example made of aluminum or copper, or a filigree shielding braid 25 made of metal wire, is provided around the wire arrangement 12. If necessary, the shielding layer 13 can also consist of a plurality of such layers. Such shielding layers 13 are sufficiently known in the technical field in a wide range of embodiments and therefore do not have to be described in more detail in this case. Since the shielding layer 13 usually consists of comparatively costly material(s), the manufacturers endeavor to make this layer as thin as possible. The shielding layer 13 is therefore usually very sensitive, in particular to mechanical loads. The protective sheath 14 is arranged as the outermost layer of the cable 4 around the shielding layer 13, protects the unit formed of the wire arrangement 12 and shielding layer 13 against external influences, and serves as electrical insulation of the cable 4.

The shielding layer 13 can also comprise a shield foil 26 that surrounds a shielding braid 25 or a metal foil (or both). The shield foil 26 is usually embodied as a plastics material film, usually as a plastics material film that is metal-coated (either by vapor deposition of a metal layer on the plastics material foil or by laminating a metal foil with a plastics material film).

For stripping the cable 4, the protective sheath 14 is to be removed along an axial region of the cable 4, usually in the region of the axial free end of the cable 4. If the shielding layer 13 also comprises a shield foil 26, the shield foil 26 is also to be removed in order to expose the shielding braid 25 or the metal foil (or both) in this region for electrical contacting. The shielding braid 25 or the metal foil (or both) should not be deformed too much or even damaged during this process.

The rolling wheel 8 and the cutting wheel 9 have different cross sections in a plane parallel to their axis of rotation 8', 9', as indicated in FIG. 3 by hatching. In particular, the cutting wheel 9 forms a radially circumferential, radially outer cutting edge 17, while the rolling wheel 8 has a blunter edge geometry radially on the outside than the cutting wheel 9, this edge geometry being referred to as a rolling contour 18 in connection with the present disclosure. The rolling contour 18 of the rolling wheel 8 is designed in dependence of the material parameters of the protective sheaths 14 to be cut and in dependence of the adjusted or adjustable pressure forces in such a way that the rolling wheel 8 does not penetrate the material of the protective sheath 14 in a cutting manner but only presses the material and displaces it a little. In contrast to this, in connection with the present teaching, a "cutting blade" is viewed as a contour which, under these conditions, penetrates the material of the protective sheath 14 in a cutting manner. The cutting wheel 9 therefore tapers at the radial end to the cutting edge 17, while the rolling wheel 8 at the radial end has an axial width as the rolling contour 18, which axial width is adjusted to the material parameters of the protective sheath 14.

The continuous load of the "rolling" of the protective sheath 14 carried out by the rolling wheel 8 having the rolling contour 18 rotating around the cable 4 impairs the quality of the material of the protective sheath 14 in the cutting region 15 and "wears down" the material. As a result, the rolling wheel 8 radially penetrates the protective sheath 14 by displacing the material of the protective sheath 14. If a cutting wheel 9 is additionally provided, the protective sheath 14 can also be easily severed by the cutting wheel 9 due to this "rolling," which supports the stripping. However, the protective sheath 14 can also be severed solely by the rolling wheel 8.

Since the shielding layer 13 is made of a different material (generally metal) than the protective sheath 14 (generally plastics material), the pressure of the rolling contour 18 rolling on the shielding layer 13 only causes a lower deformation than is the case with the material of the protective sheath 14. As soon as the rolling contour 18 thus reaches the region of the shielding layer 13, the rolling wheel 8 presses in less deeply. Ideally, the further movement of the work wheel guide 5 with the rolling wheel 8 in the guide direction 6 is stopped when the rolling contour 18 reaches the shielding layer 13. This can be achieved by suitably designing the rotational speed of the rotation base 2 and/or the eccentric weight distribution of the work wheel guide 5.

If the work wheel arrangement 10 comprises a cutting wheel 9, it is advantageous if the cutting wheel 9, which of course moves with the rolling wheel 8 as part of the work wheel arrangement 10, does not come into contact with the shielding layer 13. The shielding layer 13 therefore cannot be cut by the cutting wheel 8 and cannot become damaged as a result.

For this purpose, it can be provided that the outer radial edge of the rolling contour 18 is arranged a little closer to the axis of rotation 1 than the outer radial edge of the cutting edge 17. This is shown in FIG. 3. The difference between the (larger) distance D between the cutting edge 17 and the axis of rotation 1 and the (smaller) distance d between the rolling contour 18 and the axis of rotation 1 is very small and can, for example, be between 5% and 50%, preferably between 10 and 20% of the layer thickness of the protective sheath 14 to be severed. For example, the difference (D-d) can be between approximately 50 μm and 200 μm, in particular approximately 100 μm.

The difference (D-d) can be set by design in different ways. In an embodiment that is very easy to manufacture, for example, the rolling wheel 8 and the cutting wheel 9 can each have different outer radii, the outer radius R of the rolling wheel 8 being larger than the outer radius r of the cutting wheel 9, as shown in FIG. 3. This makes it possible to arrange the axes of rotation 8', 9' of the rolling wheel 8 and the cutting wheel 9 at the same radial distance from the axis of rotation 1, which is structurally advantageous. In another possible embodiment, the axes of rotation 8', 9' of the rolling wheel 8 and of the cutting wheel 9 can lie on different diameters. In this case, the outer radii r, R can also be the same.

Possible radii, distances, and contours are shown schematically and clearly in FIG. 3. The cable 4 arranged coaxially on the axis of rotation 1 is kept in position between the two support rollers 3 and the work wheel arrangement 10 formed of the rolling wheel 8 and cutting wheel 9 pressing against the support rollers 3 on account of the acting pressure force, for example the centrifugal force $F_{zf}$, while the rollers or wheels rotate around the cable 4 due to the rotation of the rotation base 2. In the process, the rolling wheel 8 rolls and displaces the material of the protective sheath 14 and thus very quickly leads to targeted material fatigue so that the material can be cut at this point by the "subsequent" cutting wheel 9. The rolling wheel 8 then radially penetrates this cut and displaces and wears down the material even more.

As soon as the rolling wheel 8 has reached the material of the shielding layer 13, a further displacement and penetration into the material is prevented due to the higher strength of the shielding layer 13 and wire arrangement 12, and the rolling wheel 8 rolls over on the surface of the shielding layer 13 without further penetrating the cable 4 and prevents the shielding layer 13 from coming into contact with the cutting wheel 9. This position is shown in FIG. 3 by the dashed outline of the rolling wheel 8 and cutting wheel 9. It is shown in a highly exaggerated manner that the cutting wheel 9 does not touch the shielding layer 13. The drive of the device can then be switched off, the cable 4 removed, and the separated part of the protective sheath 14 can be pulled off.

The design of the rolling contour 18, in particular the axial width and the geometry at the radial end of the rolling wheel 8, is either known or can simply be carried out by corresponding tests with cables 4 to be stripped.

In particular in the case of cables 4 having a shield foil 26 in the shielding layer 13, a high pressure force of the rolling wheel 8 on the cable 4 can be necessary in order to bring about severing of the shield foil 26. In this case, for example, the rolling wheel 8 would have to penetrate the cable 4 until the shield foil 26 is severed by a cutting wheel 9. However, this could be accompanied by greater deformation or even damage to the other parts of the shielding layer 13, in particular of a shielding braid 25, which is to be avoided. In order to provide a remedy for this problem, perforation elements 27 are provided distributed over the circumference of the rolling wheel 8 on the rolling contour 18 of the rolling wheel 8 and protrude radially by a predefined radial length L from the radially outer rolling contour 18 of the rolling wheel 8. This is shown on the basis of advantageous embodiments in FIGS. 5-8.

Figure 5:
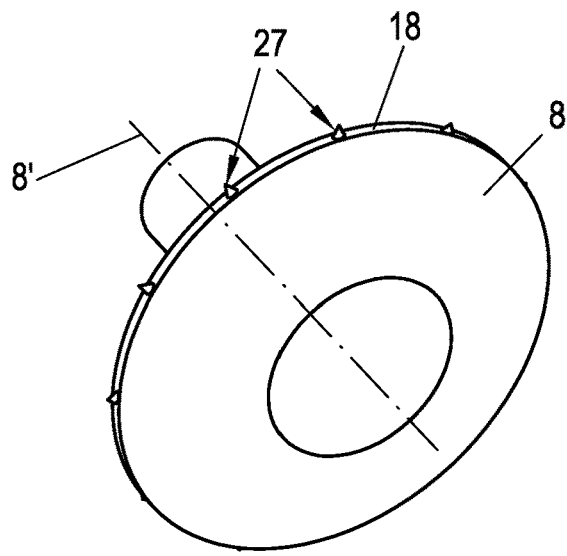
FIGS. 5 to 8 show different embodiments of a rolling wheel with perforation elements.
Figure 6:
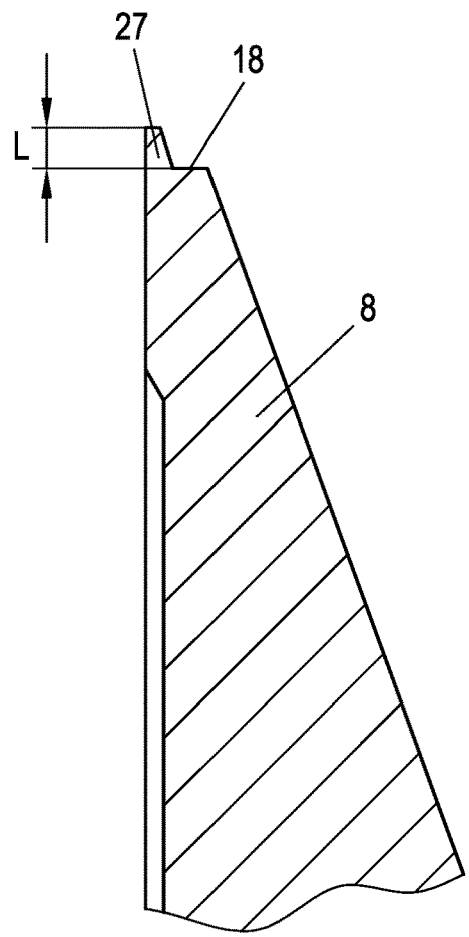

FIGS. 5 and 6 show an embodiment of a rolling wheel 8 having perforation elements 27, the perforation elements 27 being an integral part of the rolling wheel 8, i.e., being formed integrally with the rolling wheel 8. For this purpose, the rolling wheel 8 can be injection-molded, for example from plastics material (such as PEEK (polyether ether ketone) or a filled or fiber-reinforced plastics material), and then can be reworked, in particular to ensure the desired length L. However, the rolling wheel 8 can also be made of metal (steel or stainless steel), and the perforation elements 27 can be machined by means of a cutting production method. Other known production methods for producing the perforation elements 27, such as a wire erosion method or spark erosion method, are also conceivable here.

Figure 7:
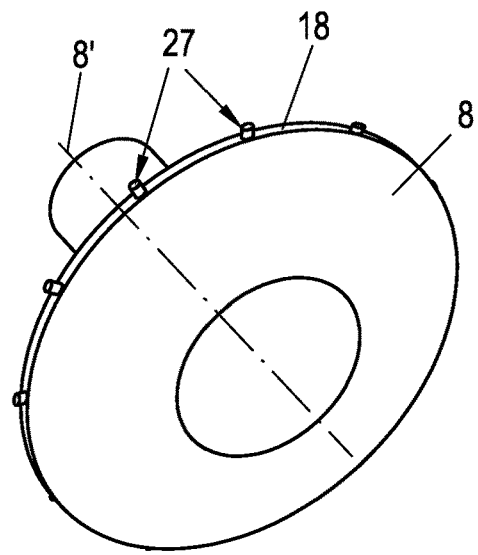
Figure 8:
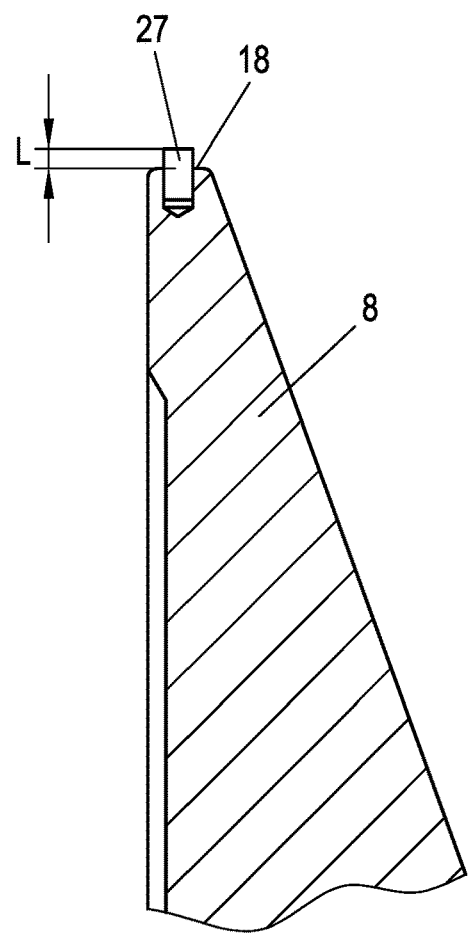

In the embodiment according to FIGS. 7 and 8, the rolling wheel 8 is made of plastics material (such as PEEK (polyether ether ketone) or a filled or fiber-reinforced plastics material) or metal (steel or stainless steel), with needles being inserted into the rolling contour 18 as perforation elements 27. The needles are produced, for example, from steel or stainless steel. The needles can have a diameter of 0.1 mm to 0.5 mm. In order to achieve a precise length L of the perforation elements 27, the needles used can be ground to the desired length L after insertion.

The shape of the protruding perforation elements 27 can be tapered, for example in a conical or pyramid-shaped manner, but can also be prismatic or cylindrical.

The length L with which the perforation elements 27 project radially from the rolling contour 18 is preferably between 0.02 mm and 0.5 mm. It can thus be achieved that the perforation elements 27 perforate a shield foil 26, typically having thicknesses of 10 to 100 μm, but do not damage other underlying parts of the shielding layer 13, in particular a shielding braid 25. No large radial pressure forces are required for the perforation, which significantly reduces or entirely prevents the risk of undesirable deformations and damage to a shielding braid 25 or other parts of the shielding layer 13. If no shield foil 26 is present, the perforation elements 27 penetrate a shielding braid 25 without deforming it significantly or disadvantageously.

By means of a rolling wheel 8 having perforation elements 27, on the one hand, the protective sheath 14 can be simply and reliably cut through as described above. If the rolling wheel 8 reaches the shielding layer 13, any shield foil 26 that is possibly present is perforated over the entire circumference of the cable 4 with few revolutions of the rolling wheel 8. Thereafter, the protective sheath 14 separated off can be easily removed with the shield foil 26, the shield foil 26 being torn off cleanly at the perforation. In this way, the stripping can be achieved with lower pressure forces and penetration depths of the rolling contour 18 into the cable 4, whereby deformations of sensitive parts of the shielding layer 13, such as a shielding braid 25, can be avoided.

The distance in the circumferential direction between two adjacent perforation elements 27 on the rolling wheel 8 (perforation increment P) is preferably selected such that, with repeated circling of the cable 4 during stripping, the perforation of the shield foil 26 produced does not result in excessively large gaps between perforations 30 or in perforations 30 (accumulations of perforations) that are too close to one another. Both can lead to an unclean separation of the shield foil 26, which can lead to the formation of tabs and to a frayed separation point. This can impair the quality of the stripped cable 4 and further use thereof.

Figure 9:
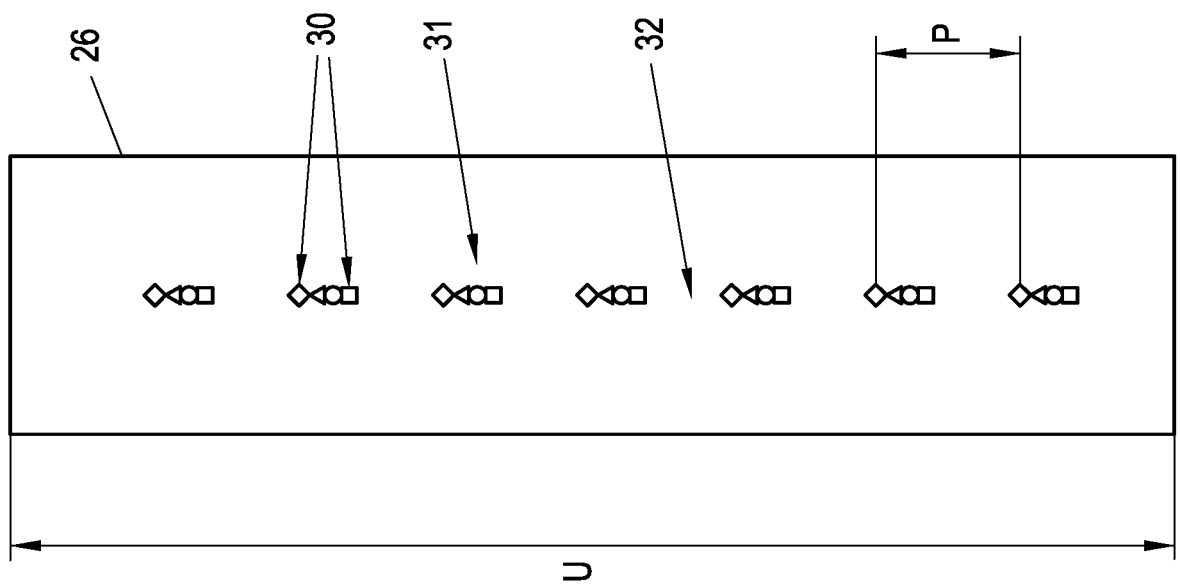
FIG. 9 shows an irregular perforation pattern.

In FIG. 9, for example, an accumulation of perforations 30, produced by the perforation elements 27, on a shield foil 26 (shown here unwound for illustration) is shown. An accumulation 31 of perforations 30 and larger gaps 32 between perforations 30 can be seen over the circumferential length U of the shield foil 26. For better understanding, the perforations 30 are shown in FIG. 9 with different geometric figures, each geometric figure corresponding to a circling of the cable 4 with the rolling wheel 8. Said accumulations 31 and gaps 32 result from an unfavorably selected perforation increment P on the rolling wheel 8. The perforation increment P is understood to mean the arc length between two adjacent perforation elements 27 on the rolling wheel 8.

To avoid such accumulations 31 or gaps 32, the perforation increment P is selected in the range $$\left[\frac{U}{n}, \frac{U}{n+1}\right],$$

where n is a natural number. U designates the circumferential length on the radius around the axis of rotation 1 in the region of the cable 4 on which the perforations 30 are to be produced. Usually, this is the radius on which the shield foil 26 to be perforated is located. n is advantageously selected in such a way that, in the case of the expected number of times the cable 4 is to be circled with the rolling wheel 8 for perforation, the distance between adjacent perforations 30 in the circumferential direction is not less than 1 to 3 mm, because also a perforation increment P that is too small can lead to unclean separation. For conventional cables 4, the natural number n is between 2 and 15, preferably between 2 and 10. If the perforation increment P is selected approximately in the center of this range, this results in a continuous application range of the rolling wheel 8 for different cable diameters in a certain diameter range, and it is possible to avoid accumulations 31 and/or gaps 32.

Figure 10:
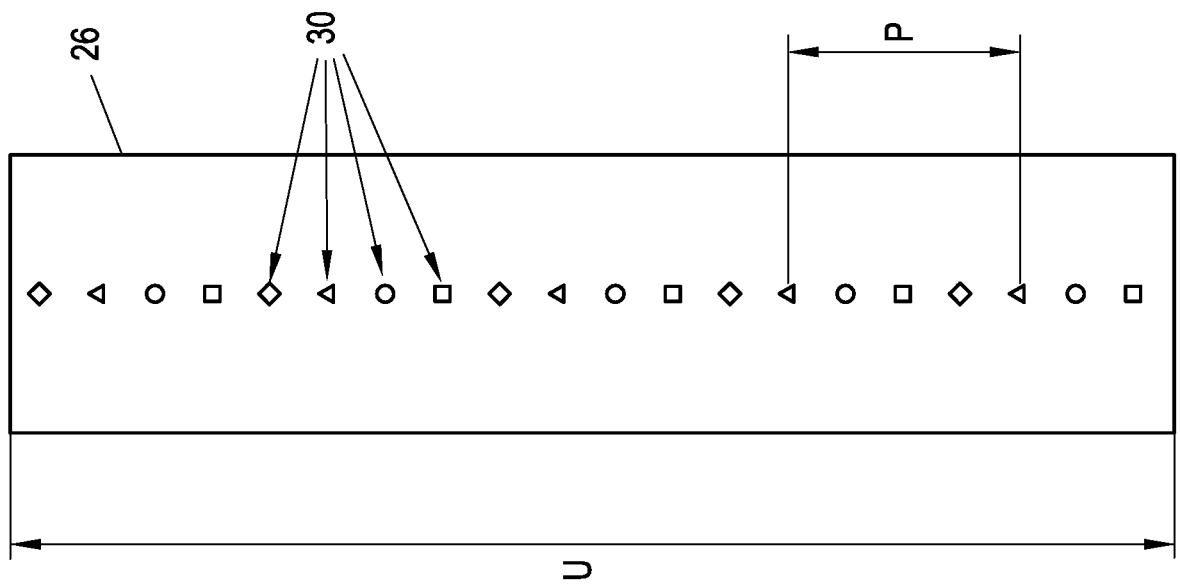
FIG. 10 shows a regular perforation pattern.

A targeted perforation pattern with perforations 30 on a shield foil 26 without such accumulations 31 and/or gaps 32 is shown in FIG. 10 for comparison.

However, it is of course also possible to use different rolling wheels 8 for different cables 4, or also for different cable diameter ranges, wherein the perforation increment P of the perforation elements 27 of the rolling wheel 8 is adapted to the particular cable 4.

Figure 11:
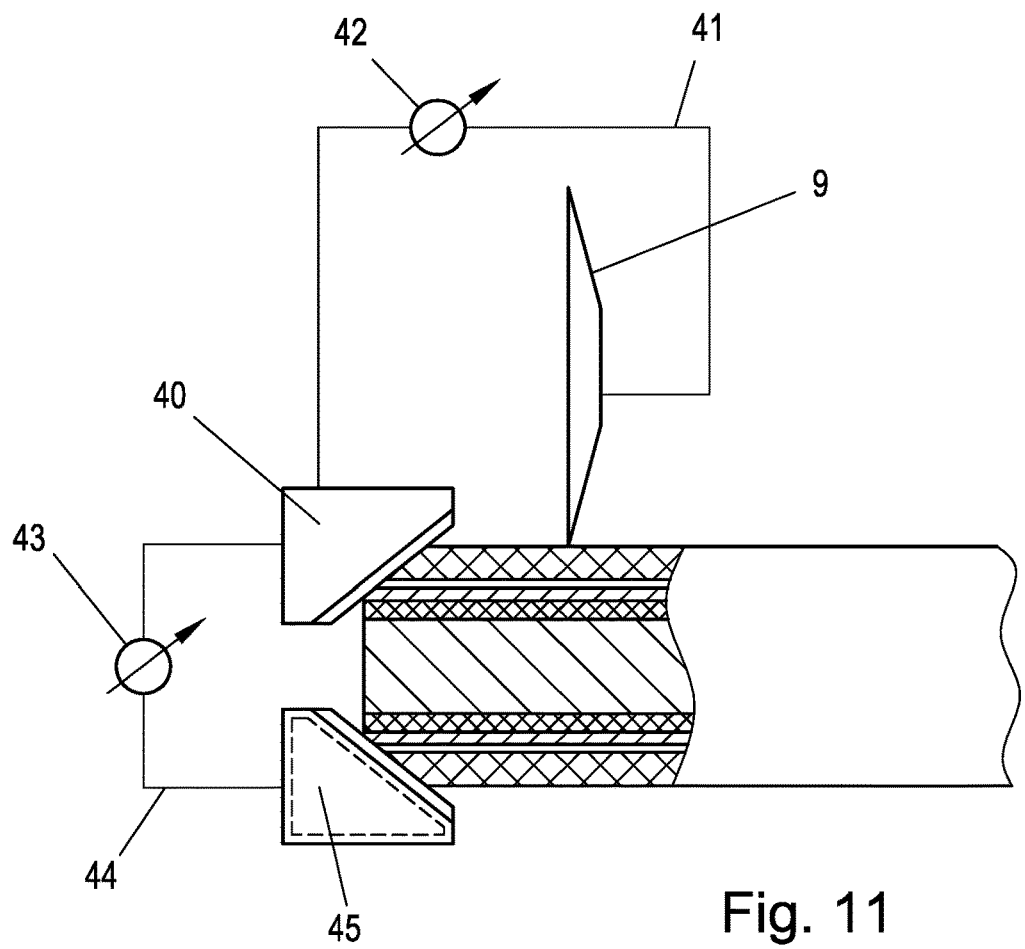
FIG. 11 shows an electrical continuity check for quality assurance of the stripping process.

For quality monitoring of the stripping process, an electrical continuity check can also be used, as explained with reference to FIG. 11. FIG. 11 shows only the cable 4, but not the other parts of the device, for example as shown in FIGS. 1 and 2. For the continuity check, a shielding braid 25 of the cable 4 is electrically contacted by means of a test contact 40. The test contact 40 can be embodied as an electrically conductive blade or brush and contacts the shielding braid 25 in the region of the axial end of the cable 4. However, the test contact 40 can also be embodied as a plate that is axially spaced apart from the cable end and is arranged in the region of the shielding braid 25. The resulting air gap between the plate and the shielding braid 25 can be bridged by supplying ionized air, so that a sufficient electrical connection results between the plate and the shielding braid 25. The test contact 40 is electrically connected to the cutting wheel 9 via a test line 41. For this purpose, the cutting edge 9 must be electrically conductive. An electrical connection between the test contact 40 and the cutting wheel 9 can then be identified via a measuring device 42, for example by applying a test voltage and measuring a current. In the case of a detected electrical connection, the cutting wheel 9 would have had undesired contact with the shielding braid 25, which is recognized in this way and allows further use of the cable to be prevented.

A second test contact 45 (dashed in FIG. 11) can also be provided, and, as described above, should also contact the shielding braid 25. This second test contact 45 is connected to the first test contact 40 via a second test line 44. In this way, an electrical continuity check between the first test contact 40 and the second test contact 45 can be carried out via a second measuring device 43 in order to ensure that the first test contact 40 contacts the shielding braid 25. The sequence of the check can be carried out in such a way that the first and second test contacts 40, 45 and a continuity check are first used to determine whether the first test contact 40 electrically contacts the shielding braid 25 and then the first test contact 40 is used to continuously check whether the cutting wheel 9 touches the shielding braid 25.

With such a continuity check, it is also possible to recognize if the rolling wheel 8 reaches the shielding braid 25 or the shield foil 26. If the rolling wheel 8 is designed to be electrically conductive, it is possible, as explained above, to use a test contact on the shielding braid 25 that is electrically connected to the rolling wheel 8 to determine that the perforation elements 27 of the rolling wheel 8 penetrate the shielding braid 25. If this is determined, the stripping process of the cable 4 can be stopped. If a shield foil 26 is also present in the cable 4, it is thus ensured at the same time that the shield foil 26 was also perforated in the desired manner by the perforation elements 27.

Due to the simple and stable construction, the device according to the present teaching can be operated at high speeds, for example between 100 rpm and 5000 rpm. The process of stripping a cable 4 can thus be carried out very quickly, with only a few seconds being required for a stripping process. It is also not necessary to measure the severing of the protective sheath 14 with complex and error-prone devices, since severing the desired parts of the shielding layer 13 is in any case ruled out with the device according to the present teaching.

In FIG. 3, the rolling wheel 8 and the cutting wheel 9 are shown spaced relatively far apart for reasons of clarity. However, in order to securely clamp the cable 4 between the work wheel arrangement 10 and the support rollers 3, it is preferred to arrange the rolling wheel 8 and the cutting wheel 9 close to one another, it being possible for the circumferential contours of the two wheels to optionally also overlap if the wheel profiles allow this. Wheel profiles of the rolling wheel 8 and cutting wheel 9 which allow overlapping are shown in FIG. 2, for example. This arrangement makes use of the property of the rolling wheel 8, which deforms and wears down the material of the protective sheath 14 not only in direct contact, but also in a specific region laterally of this contact.

Figure 12:
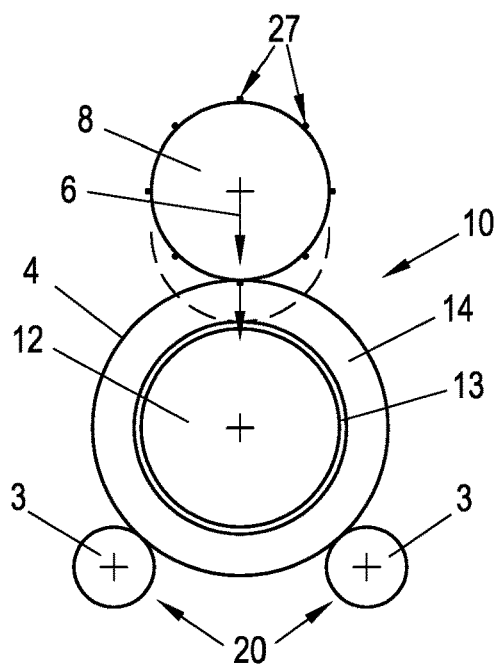
FIG. 12 shows a device having a rolling wheel as a work wheel arrangement.

In the embodiment according to FIG. 12, the work wheel arrangement 10 has only one rolling wheel 8 having the perforation elements 27, which rolling wheel rolls over on the cable 4 in such a way that it presses against the protective sheath 14 and fatigues the sheath material until it can no longer offer sufficient resistance to penetration by the rolling wheel 8. The rolling wheel 8 penetrates further and further into the material of the protective sheath 14 until it has reached the shielding layer 13 and the perforation elements 27 perforate a shield foil 26 (if present).

Figure 13:
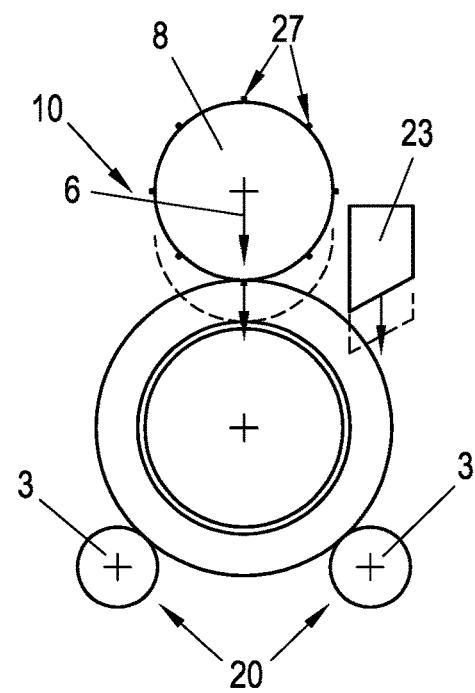
FIG. 13 shows a device having a rolling wheel and a cutting blade as a work wheel arrangement.

FIG. 13 shows a further alternative embodiment of the work wheel arrangement 10. FIG. 13 shows that not only wheels can be used in the work wheel arrangement 10, but that it can also comprise other, non-rolling elements. In particular, FIG. 13 shows a rolling wheel 8 which has perforation elements 27 and which is combined with an "off-center" cutting blade 23. The arrangement of the cutting blade 23 is selected such that, when the device is functioning properly, said cutting blade cannot come into contact with parts of the shielding layer 13 that must not be damaged. In this case, the cutting blade 23 is arranged on the work wheel guide 5 in a stationary (but possibly adjustable) manner when the device is used. The cutting blade 23 is arranged in such a way that, when the work wheel guide 5 is moved in the guide direction 6, the cutting blade 23 cannot touch the shielding layer 13 or certain parts thereof. Due to the known geometry of the cable 4, this is easy to accomplish. The cutting blade 23 supports the severing of the protective sheath 14 with the rolling wheel 8.

The invention claimed is:

1. A device for stripping a cable having an outer protective sheath, the device having a support roller arrangement and a work wheel arrangement, the support roller arrangement being arranged on a rotation base rotatable about an axis of rotation and the work wheel arrangement being arranged on a work wheel guide, the rotation base and the work wheel guide being connected to one another via at least one guide and the work wheel guide being displaceable relative to the rotation base in a guide direction running transversely to the axis of rotation, wherein the support roller arrangement comprises at least two support rollers each mounted on the rotation base so as to be rotatable about a support roller axis and the work wheel arrangement comprises a rolling wheel mounted on the work wheel guide so as to be rotatable about a rolling wheel axis and wherein a clamping region is formed around the axis of rotation and between the at least two support rollers and the rolling wheel, which clamping region can, by displacing the work wheel guide in the guide direction relative to the rotation base, be enlarged and reduced depending on the displacement direction, wherein a plurality of perforation elements are arranged on the rolling wheel on a radially outer rolling contour such that they are distributed over the circumference, which perforation elements protrude radially by a length from the rolling contour.

2. The device according to claim 1, wherein the work wheel arrangement additionally comprises a cutting wheel mounted on the work wheel guide so as to be rotatable about a cutting wheel axis and having a radially outer cutting edge, whereas the clamping region is formed between the at least two support rollers, the rolling wheel and the cutting wheel.

3. The device according to claim 2, wherein the radially outer rolling contour of the rolling wheel has a blunter edge geometry than the radially outer cutting edge of the cutting wheel.

4. The device according to claim 2, wherein the radially outer rolling contour of the rolling wheel is arranged closer to the axis of rotation than the radially outer edge of the cutting edge of the cutting wheel.

5. The device according to claim 2, wherein the rolling contour defines a cutting region and the cutting edge of the cutting wheel or the cutting blade is arranged in said cutting region.

6. The device according to claim 1, wherein the work wheel arrangement additionally comprises a cutting blade arranged on the work wheel guide.

7. The device according to claim 1, wherein the length is between 0.02 mm and 0.5 mm.

8. The device according to claim 1, wherein two perforation elements adjacent in the circumferential direction are arranged spaced apart from one another in the circumferential direction by a perforation increment, the perforation increment being in a range $$\left[\frac{U}{n}, \frac{U}{n+1}\right].$$

n being a natural number between 2 and 15, and U indicating a circumferential length on a radius about the axis of rotation on which the perforation elements produce perforations when the device is used.

9. The device according to claim 1, wherein the work wheel guide has an eccentric weight distribution in relation to the axis of rotation, as a result of which a centrifugal force acts on the work wheel guide when the rotation base with the work wheel guide arranged on the rotation base via the guides rotates about the axis of rotation.

10. A method of using the device according to claim 1, for stripping a cable having an outer protective sheath, the end of the cable to be stripped being clamped in the clamping region between the rolling wheel of the work wheel arrangement and the at least two support rollers of the support roller arrangement by applying a pressure force, the unit formed of the work wheel arrangement and the support roller arrangement rotating around the cable by rotation of the rotation base causing the rolling wheel and the at least two support rollers to roll over on the cable and the work wheel arrangement to displace in the guide direction toward the axis of rotation, so that the rolling wheel radially penetrates the protective sheath of the cable in a cutting region produced by the rolling contour and severs the protective sheath of the cable along the circumference.

11. The method according to claim 10, wherein, if the work wheel arrangement additionally comprises a cutting wheel or a cutting blade, the cutting wheel or the cutting blade additionally penetrates the protective sheath of the cable in the cutting region of the rolling wheel and supports the severing of the protective sheath.

12. The method according to claim 11, wherein the shielding layer comprises a shielding braid and a shield foil surrounding the shielding braid, and the rolling wheel radially penetrates the cable until the rolling contour reaches the shield foil in the cable, as a result of which the shield foil is perforated over the circumference thereof by the perforation elements of the rolling wheel.

13. The method according to claim 11, wherein the shielding braid of the cable to be stripped is electrically contacted by an electrical test contact, and the test contact is electrically connected to the cutting wheel or the cutting blade, and a measuring device and an electrical continuity check are used to check whether the cutting wheel, or the cutting blade comes into contact with the shielding braid during stripping.

14. The method according to claim 10, wherein the rolling wheel radially penetrates the protective sheath of the cable until the rolling contour reaches a shielding layer in the cable.

15. The method according to claim 10, wherein the shielding braid of the cable to be stripped is electrically contacted by an electrical test contact, and the test contact is electrically connected to the rolling wheel, and a measuring device and an electrical continuity check are used to check whether the rolling wheel comes into contact with the shielding braid during stripping and the stripping process is ended in the event that contact is identified.

* * * * *